United States Patent [19]

Jordan et al.

[11] 3,740,831

[45] June 26, 1973

[54] SOLDERING FLUXES

[75] Inventors: David Paul Jordan, Warwick; George John Collini, Vails Gate, both of N.Y.

[73] Assignee: The International Nickel Company, Inc., New York, N.Y.

[22] Filed: July 28, 1971

[21] Appl. No.: 167,025

[52] U.S. Cl. .................... 29/495, 148/23, 260/287, 260/289, 423/407
[51] Int. Cl. ..... B23k 35/36, C23c 1/17, C07d 33/50
[58] Field of Search ................................ 148/22–26; 260/569, 288, 289, 307, 308, 289 O X, 287 O X; 423/407, 408; 29/495

[56] References Cited

UNITED STATES PATENTS

| | | | |
|---|---|---|---|
| 2,880,125 | 3/1959 | Jordan | 148/23 |
| 2,880,126 | 3/1959 | Jordan | 148/23 |
| 2,844,479 | 7/1958 | Miller | 148/25 |
| 2,980,562 | 4/1961 | Matter | 148/23 |
| 3,119,179 | 1/1964 | Gale | 148/26 |
| 3,220,892 | 11/1965 | Durham | 148/23 |
| 3,344,001 | 9/1967 | Thompson | 148/23 |
| 3,201,241 | 8/1965 | Munder | 260/289 O X |
| 2,121,449 | 6/1938 | Schneiderwirth | 260/287 O X |
| 3,351,525 | 11/1967 | Hodel | 260/287 O X |
| 3,312,708 | 4/1967 | Lind | 260/289 O X |

FOREIGN PATENTS OR APPLICATIONS 770,698  3/1957  Great Britain ....................... 148/23

*Primary Examiner*—L. Dewayne Rutledge
*Assistant Examiner*—Peter D. Rosenberg
*Attorney*—Maurice L. Pinel

[57] ABSTRACT

Flux compositions include as flux activators hydrazinium salts of certain organic chelaters which have a nitrogen atom and a phenolic OH group in bidentate relation. The fluxes are suitable for use in soldering nickel and nickel alloys as well as copper and copper alloys.

20 Claims, No Drawings

SOLDERING FLUXES

The present invention is directed to novel and improved compositions for use as soldering fluxes, particularly fluxes for use in soft soldering operations.

The expression "soldering" as used herein refers to the joining together of metallic surfaces by means of a lower melting metallic filler. In soldering, a flux is customarily used to remove oxide layers from, and to prevent the formation of such layers on, the heated metallic surfaces which are to be joined. A flux may consist of as many as four components, i.e., (1) a chemical agent (flux activator) to reduce or transform surface oxides to a removable form; (2) a wetting agent to promote the spreading of the flux on the hot metal; (3) a polymeric material to hold the chemical agent in contact with the hot metal surface so that the reaction can take place; and (4) a solvent, e.g., isopropanol, to serve as a medium for the flux system. The chemical agents used in fluxes may be oxide dissolvers such as borates, fluorides, or acid salts ($CaCl_2$, $SnCl_2$ and $ZnCl_2$), reducing agents such as hydrazine and oxalic acid and organic acids such as maleic anhydride and tetrachloropthalic anhydride (the terpine acids present in natural rosin being in this class). The polymeric material of the flux tends to dissolve the reaction products of the fluxing reaction and protects the fresh metal surface until the molten solder is added at which time the polymeric material floats to the solder surface leaving the metal surface sufficiently oxide-free for the formation of a strong bond.

In the field of semi-conductor devices, such as transistors and integrated circuit devices, the soldering of the external leads has presented certain difficulties. The leads of such devices are often composed of nickel and nickel-base alloys due to the compatibility of such materials with glass (the close correspondence of coefficients of thermal expansion) and for other reasons. In the soldering of such nickel-containing materials to copper conductors with soft solders, it is found that non-corrosive fluxes do not permit good wetting by the tin-lead solders, while the more acidic fluxes, e.g., one activated with an amine hydrochloride, which provide satisfactory wetting, leave corrosive residues after soldering which are unacceptable in electronic applications. Where a good solder bond is essential in such applications, a thin gold plating is used to assure bonding with non-corrosive fluxes.

It is clear that there is a need for a flux which will provide the good wetting required for soldering these critical connections, which does not leave a corrosive residue and does not require a special plating operation.

It is an object of this invention to provide improved soldering fluxes.

Other objects and advantages will become apparent from the following description.

Generally speaking, the novel flux compositions of this invention include as a flux activator an effective amount of a hydrazinium salt of an organic chelater in which the organic portion of the salt molecule is characterized by a structure in which a nitrogen atom and a phenolic OH group are in bidentate relation. The chelate has a bidentate structure containing no more than one nitrogen atom which is capable of forming with a metal atom a five or six member nitrogen-metal-oxygen chelate ring. The unusual characteristics of the special group of organic chelaters in the flux produces much of the beneficial results observed in using the fluxes of the invention. One organic chelater useful in the fluxes of the invention is 8-quinolinol ($C_9H_6NOH$) having the general formula:

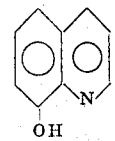

OH      8-quinolinol

The hydrazinium salt ($C_9H_6NOH \cdot N_2H_4$) of this organic compound is capable of reducing metal oxides on the surface of members to be soldered. It will be observed that the bidentate structure containing the nitrogen and hydroxy groups is capable of forming a five-member chelate ring with a metal atom (M) as follows:

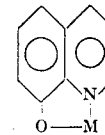

O——M

Thus, the metal atoms produced by the reducing action of the hydrazine portion of the flux activator are sequestered by the organic portion of the activator. The flux activator is generally disposed in an appropriate vehicle.

Another organic compound which has characteristics similar to 8-quinolinol, and is therefore suitable for use in the fluxes of this invention, is 2-hydroxyphenylbenzooxazole ($C_7H_4NOC_6H_4OH$). The structure of this compound is as follows:

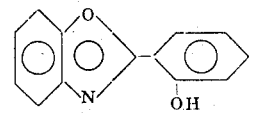

OH      2-hydroxyphenylbenzooxazole

The suitable organic compounds, it will be noted, both have bidentate structures which contain no more than one nitrogen atom and are capable of forming either a five or a six-member chelate ring with a metal atom.

The carbon atoms contained in the ring structures of the organic chelaters are shown with valencies satisfied by hydrogen atoms and it will be understood that alkyl radicals (containing from one to 15 carbon atoms) may be substituted therefor, but that such substitution must not be made at the carbon atoms next adjacent to the active segment of the bidentate structures.

In preparing the hydrazinium salts of organic chelaters, hydrazine is merely mixed together with the organic chelater in an alcohol or other solvent, e.g., methanol, at room temperature, in approximately stoichiometric amounts. The hydrazinium salts obtained in this fashion are incorpora-ted in suitable vehicles thereby providing the hydrazinium component in the fluxes of the invention.

An appropriate vehicle for the hydrazinium component, prepared as described above, is a waxy or viscous polymeric material which may include various other ingredients such as a solvent, e.g., methyl, ethyl or isopropyl alcohols or combinations thereof, and wetting or spreading agents. A polyethylene glycol compound having a molecular weight of at least 1,000, such as that sold under the tradename Carbowax 4,000, imparts a desirable waxy consistency to the flux composition. Glycerine and polyalcohols, e.g., the alkyl aryl polyether alcohol sold under the tradename Triton X-100, are satisfactory as wetting and spreading agents. The hydrazinium component constitutes from about 1 percent up to about 30 percent, by weight, of the flux compositions. Another appropriate vehicle for the hydrazinium component includes a rosin, such as "water-white" rosin (a low acid number rosin) which itself is commonly used as a soldering flux in the field of electronics and a solvent, such as methanol. Again, the hydrazinium component constitutes from about 1 percent up to about 30 percent, by weight, of the flux.

The tin-lead solders with which the fluxes of the invention are used may contain from about 5 percent up to about 70 percent tin with the remainder lead. Small additions of other metals may be present such as, for example, up to about 5 percent antimony, about 0.1 percent arsenic and up to about 10 percent cadmium. Among the solders which are well adapted for use with the fluxes of the present invention are the soft solders composed of tin and lead, in the respective proportions, by weight, of 50/50 percent, 60/40 percent and 33/67 percent.

The soldering fluxes of the invention are particularly useful in connection with the soldering of the nickel-iron family of alloys containing up to over 99 percent nickel, for example, 29 percent nickel, with the balance primarily iron, but which may also include substantial amounts of cobalt, e.g., up to about 25 percent cobalt, in some cases. One or more of other elements may also be present in the nickel-iron alloys in the amounts of up to about 3 percent titanium, up to about 5 percent chromium and up to about 5 percent molybdenum. The fluxes of the invention also work very well in soldering copper and copper alloys.

For the purpose of giving those skilled in the art a better understanding of the invention, and/or a better appreciation of the invention, the following example is given for the preparation and utilization of a flux containing a hydrazinium salt in accordance with the invention.

EXAMPLE I

Hydrazinium quinolinolate was prepared by mixing 180 grams of 8-quinolinol, a white crystalline solid, 40 milliliters of hydrazine ($N_2H_4$), a colorless liquid, in 400 milliliters of methanol at room temperature. The 8-quinolinol and the hydrazine were completely soluble in the methanol and a clear solution of hydrazinium quinolinolate was obtained. On standing overnight, yellow needles of the hydrazinium salt crystallized out. These were collected, washed and dried. The salt was sensitive to the humidity of the air and was therefore stored in a closed container.

The flux of the invention was prepared by mixing, at room temperature, 500 milliliters of methanol, 200 grams of a polyethylene glycol (Carbowax 4,000), 220 grams of hydrazinium quinolinolate prepared as described above, 20 milliliters of an alkyl aryl polyether (Triton X-100) wetting agent and 80 milliliters of glycerine. The ingredients were mixed thoroughly and a homogeneous waxy paste was obtained.

The identical steps were repeated using the chelater 2-hydroxyphenylbenzooxazole, in place of 8-quinolinol.

The fluxes were evaluated for the promotion of solderability of nickel (commercial purity — 99.5 percent nickel) and nickel-iron alloys. Table I below sets forth the nominal compositions of the nickel-iron alloys tested.

TABLE I

| Alloy No. | Ni | Co | Fe |
|---|---|---|---|
| 1 | 42 | N.A.* | Bal. |
| 2 | 50 | N.A.* | Bal. |
| 3 | 29 | 17 | Bal. |

*Not added

Samples of nickel of commercial purity and of the above alloys were aged for 1 hour over boiling distilled water to similate 6 months aging of the type which would occur in shelf storage. The samples were then dipped briefly into the flux and held under an infrared heater for 10 seconds achieving a preheating temperature in the range from about 200°C. to about 300°C. When they were immersed in molten 60/40 tin-lead solder in the temperature range from about 255° to about 265°C., e.g., 260°C., 100 percent wetting was observed. That is, the sample surfaces were completely coated with mirror-bright solder free of beading and without pinholes.

The non-corrosive nature of the residues of this flux was demonstrated by the following: Aged samples of the four metals mentioned above were soldered to 5 mil copper wires. In the case of each metal, one soldered set was prepared using the experimental flux and one using a commercial water soluble flux recommended for electronic components and containing as its active ingredient an amine hydroxychloride. Both sets were subjected to 80 percent humidity at 38°C. for 48 hours. All samples which had been soldered using the commercial flux showed pitting of the copper wire and the iron-containing alloys were discolored by corrosion. The samples which had been soldered using the experimental flux were essentially unchanged by the exposure.

The joints obtained between the nickel and nickel alloys and the copper conductors using the fluxes of the invention were in every way equal to or better than the standards required in the electronic industry.

EXAMPLE II

The hydrazinium salt of 8-quinolinol (hydrazinium quinolinolate) prepared as described in Example I was added in predetermined amounts to a water-white rosin flux of the type used in the electronic industry, which is a 50 percent solution of the rosin in methanol. Fluxes having concentrations of 1, 5, 10 and 30 percent of hydrazinium quinolinolate activator were thus prepared. Copper specimens were oxidized by exposing the surfaces thereof to an air stream at a temperature of 300°C. for 2 minutes. The fluxes having 1 and 5 percent concentration of the activator were capable of removing the hard oxide films on the copper specimens and rendering them solderable with molten 60/40 tin-lead solder at about 260°C. Such specimens were not solderable with unactivated water-white rosin flux. The fluxes having 10 or 30 percent concentration of the hydrazinium quinolinolate in water-white rosin promote the soldering of nickel and nickel-base alloys. Pure nickel and nickel-alloy specimens, oxidized as described in Example I, were soldered with a 60/40 tin-lead solder using fluxes with these concentrations of hydrazinium quinolinolate and exhibited high solderability. Excellent joints were obtained in every way equivalent to the standards of the electronic industry and a minimum of residue was evident after completing the joint.

In common with other fluxes, the flux of the present invention requires a preheating period and it has been found that from about 5 seconds to about 1 minute in contact with the work at about 150°C. to about 300°C. is sufficient for this purpose. The flux residue is non-corrosive and a dip in methanol or isopropanol will remove most of it. It has further been found that the mechanical action of an alcohol (e.g., methanol) spray is even more efficient in removal of residues.

Thus, it is seen that highly desirable flux compositions have been provided which are particularly useful with nickel and nickel-base alloys for use in the field of electronics.

As an indication of the unique qualities of the organic chelaters suitable for use in the fluxes of the invention, fluxes were made up in which the hydrazinium salt of 2-hydroxyphenylbenzotriazole ($C_6H_4N_3C_6H_4OH \cdot N_2H_4$) was the flux activator. The organic compound has the general formula:

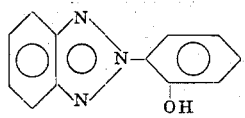

As can be seen from the structure, the molecule superficially resembles those used successfully in the fluxes of the invention. However, it must be noted that the bidentate structure of the molecule includes two nitrogen atoms. It was found that when fluxes made with this compound in accordance with the procedure described in Example I were used, little or no wetting of the metal substrate occurred.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A soldering flux containing as a flux activator an effective amount of a hydrazinium salt of an organic chelater wherein the molecule of the organic chelater is characterized in having a nitrogen atom in bidentate relation with a phenolic OH group so that by the introduction of a metal atom a five or six-member nitrogen-metal-oxygen chelate ring can be formed containing no more than one nitrogen atom.

2. The soldering flux of claim 1 wherein the hydrazinium salt has the general formula $C_9H_6NOH \cdot N_2H_4$ and is present in the flux in the amount of from about 1 percent to about 30 percent, by weight.

3. The soldering flux of claim 1 wherein the hydrazinium salt has the general formula $C_7H_4NOC_6H_4OH \cdot N_2H_4$ and is present in the flux in the amount of from about 1 percent to about 30 percent, by weight.

4. A flux composition comprising an effective amount of a flux activator in a suitable vehicle, the vehicle including a solvent and a polymer having a molecular weight of at least about 1,000, the flux activator consisting of a hydrazinium salt of an organic chelater in which a nitrogen atom is associated with a phenolic OH group in bidentate relation such that by the introduction of a metal atom a five or six-member nitrogen-metal-oxygen chelate ring is formed containing no more than one nitrogen atom.

5. The flux composition of claim 4 wherein the flux activator is present in an amount from about 1 percent to about 30 percent.

6. The flux composition of claim 5 wherein the flux activator is $C_9H_6NOH \cdot N_2H_4$.

7. The flux composition of claim 6 wherein the solvent is an alcohol selected from the group consisting of methanol, ethanol, isopropanol and combinations thereof.

8. The flux composition of claim 7 wherein the vehicle includes a polyethylene glycol.

9. The flux composition of claim 8 containing a small amount of glycerine and an alkyl aryl polyether alcohol as wetting and spreading agents.

10. The flux composition of claim 7 wherein the vehicle includes water-white rosin.

11. The flux composition of claim 5 wherein the flux activator is $C_7H_4NOC_6H_4OH \cdot N_2H_4$.

12. The flux composition of claim 11 wherein the solvent is an alcohol selected from the group consisting of methanol, ethanol, isopropanol and combinations thereof.

13. The flux composition of claim 12 wherein the vehicle includes a polyethylene glycol.

14. The flux composition of claim 13 containing small amounts of glycerine and an alkyl aryl polyether alcohol as wetting and spreading agents.

15. The flux composition of claim 12 wherein the vehicle includes water-white rosin.

16. In a method of soldering for producing electrical connections between nickel and nickel alloy lead members and copper conductors, or between copper conductor members, wherein a flux is applied to the member to be joined and preheated and then molten solder is applied to form the joint, the improvement consisting of applying a flux containing a flux activator composed of a hydrazinium salt of an organic chelater wherein the molecule of the organic chelater has a nitrogen atom in bidentate relation to a phenolic OH group such that by the introduction of a metal atom a five or six member nitrogen-metal-oxygen chelate ring can be formed containing no more than one nitrogen atom.

17. The method of claim 16 wherein the flux includes a vehicle having as a component thereof a high molecular weight polymer, and the flux activator is present in the amount of from 1 percent to about 30 percent, by weight.

18. The method of claim 17 wherein the flux activator is $C_9H_6NOH \cdot N_2H_4$.

19. The method of claim 17 wherein the flux activator is $C_7H_4NOC_6H_4OH \cdot N_2H_4$.

20. A soldering flux containing a flux activator which is produced by mixing, in a solvent, approximately stoichiometric amounts of hydrazine and an organic chelater selected from the group consisting of 8-quinolinol and 2-hydroxyphenylbenzooxazole.

* * * * *